United States Patent [19]

Pizzano et al.

[11] Patent Number: 5,319,686
[45] Date of Patent: Jun. 7, 1994

[54] DRY TRANSFER OF SPENT NUCLEAR RODS FOR TRANSPORATION

[75] Inventors: John R. Pizzano; Robert M. Donovan, both of Newport News, Va.

[73] Assignee: Newport News Shipbuilding and Dry Dock Company, Newport News, Va.

[21] Appl. No.: 100,621

[22] Filed: Jul. 30, 1993

[51] Int. Cl.$^5$ .............................................. G21C 19/00
[52] U.S. Cl. ...................................... 376/272; 376/262
[58] Field of Search ............................... 376/272, 261

[56] References Cited

U.S. PATENT DOCUMENTS

| | | | |
|---|---|---|---|
| 3,765,549 | 10/1973 | Jones | 376/272 |
| 3,819,066 | 6/1974 | Jones | 376/272 |
| 3,914,613 | 10/1975 | Shallenberger et al. | 376/272 |
| 3,945,509 | 3/1976 | Weems | 376/272 |
| 4,055,508 | 10/1977 | Yoli et al. | 376/272 |
| 4,081,086 | 3/1978 | Shallenberger et al. | 376/272 |
| 4,088,733 | 5/1978 | De Schepper et al. | 423/139 |
| 4,302,680 | 11/1981 | Ahner et al. | 250/506 |
| 4,310,034 | 1/1982 | Guilloteau et al. | 376/260 |
| 4,800,062 | 1/1989 | Craig et al. | 376/272 |
| 5,204,054 | 4/1993 | Townsend et al. | 376/272 |

*Primary Examiner*—Donald P. Walsh
*Assistant Examiner*—Frederick H. Voss
*Attorney, Agent, or Firm*—Lalos & Keegan

[57] ABSTRACT

The spent nuclear fuel rods stored in a wet pit are extracted dry and transported dry to a transport container for dry transportation to a storage area or treatment center. The spent nuclear fuel rods are withdrawn from the wet pit, held within a cask that may be selectively closed at the bottom and transferred while the rod is dry after it is removed from the wet pit and then positioned over a dry container with an open top for a dry transfer of each of the rods to the container. Between the container and the cask is a closure that includes a shield plug and a shielding base that supports the shield plug and allows the shield plug to be moved on guide rails to the position above the open top of the container where the shield plug may then be raised allowing the shielding base to be moved out of position on the rails and the shield plug lowered to close off the container.

Selective positioning and inspection of each rod in the cask into a cell in the container is accomplished by either or both the rotation of a rotatable locator plate located between the cask and the container having an access opening smaller than the opening into the container or the reorientation of the cask with respect to the container using alignment pins on the locator plate to mate with bores in the bottom of the cask.

32 Claims, 14 Drawing Sheets

DRY TRANSFER OF SPENT NUCLEAR RODS FOR TRANSPORATION

BACKGROUND OF THE INVENTION

This invention relates generally to the handling of spent nuclear materials and more particularly to the handling of spent nuclear fuel rods for transportation to storage areas or for further treatment.

The generation of power from nuclear materials has been well known in the art for many decades whether the generation is for naval vessels or for electric utility power for commercial use. The nuclear material has after a period of time been unable to generate the energy necessary and must be removed from the reactor and stored temporarily in the conventional wet pit, which is an enclosed environment where the nuclear material, usually in the form of rods, is immersed in water. The purpose of the water is to allow the rods to cool from the very high radioactivity that would be experienced in the reactor. Wet pits have been used for many years to store the spent nuclear fuel rods but in recent times the storage capability of the wet pits has become limited and it is necessary to remove the spent nuclear fuel rods from the wet pit and transport them to a temporary storage site or to permanent storage as in a deep hole in the earth or within a mountain or the like, or have the rods reprocessed.

The transportation of such a spent nuclear fuel rod has been a troubling problem over the decades and one that has not been solved satisfactorily. The problem has become more acute in very recent times and must be solved successfully if nuclear energy is to thrive as an energy source.

The current commercial industrial practice is not a dry fuel rod transfer but rather includes the step of submerging a storage cask into the nuclear fuel storage wet pit that is typically maintained by electric utilities. Then under water through the use of cranes and grappling hooks and the like, the spent nuclear fuel rods are transferred while still under water into the submerged storage cask. The storage cask is then lifted from the wet pit, the interior drained and the cask dried on the outside and sealed. Many utilities cannot use this process to transfer spent nuclear fuel because of constraints on existing utility lifting and handling resources.

As the water in the wet pit is contaminated with nuclear materials so would the exterior of the storage cask be contaminated and thus upon its emergence from the wet pit it must have its exterior decontaminated before the container can be transferred to storage.

Without the present invention, dry transfer of the spent nuclear rods would involve the construction of a large highly shielded building in which the casks are opened and the fuel moved while unshielded from one cask to another for transportation. This usually would have to be done by remotely controlled means. Dry transfer of the spent nuclear fuel rods from a wet pit to a container has been previously accomplished but in such cases the dry transfer would then be made to a container filled with water which is to be removed before transport. Removal of water from such containers requires the handling, storage and/or treatment of this radioactive material contaminated water which is highly undesirable.

OBJECTS OF THE INVENTION

It is accordingly the object of the present invention to provide method and apparatus a) for transferring spent nuclear fuel rods dry for transportation to a storage area or treatment center, b) for receiving spent nuclear fuel rods in a dry condition and maintain such rods dry in a transport container, c) for the withdrawal of spent nuclear fuel rods from a wet pit and transfer of such rods dry in a transfer cask to a container without either the requirement of having the container filled with liquid or having a special enclosure or environment to protect against the possible radiation from such spent nuclear fuel rods, d) for selectively positioning the dry transfer cask over the receiving container such that the spent nuclear fuel rods may be placed in preselected positions.

SUMMARY OF THE INVENTION

The present invention includes method and apparatus for the dry extraction of spent nuclear fuel rods stored in a wet pit and transported dry to a transport container for ultimate transportation to a storage area or treatment center. The spent nuclear fuel rods are withdrawn from the wet pit, held within a cask that may be selectively closed at the bottom and transferred with the dry rod to a position atop a dry container for a dry transfer of each of the rods to the container. Between the container and the cask is a closure that includes a shield plug and a shielding base that supports the shield plug for allowing the shield plug to be transported on guide rails to the position above the open container where the shield plug may then be raised allowing the shielding base to be moved out of position on the rails and the shield plug lowered to close off the container.

With multiple fuel rods withdrawn from the pit into the cask, it is important to allow for selective positioning of each rod in the cask to an assigned location in the container. To accomplish that, a rotatable locator plate having an access opening smaller than the opening into the container to provide shielding, may rotate to selectively open for communication between the superposed cask and the lower container various locations for depositing the nuclear rods. A temporary plug may be seated in the access opening when the cask is removed from the rotatable locator plate to provide shielding and containment. Alignment pins on the locator plate permit the orientation of the cask with respect to the container.

THE DRAWINGS

FIGS. 13, 14, 15, 16, 17, 18, and 19 all illustrate various positioning of the locator plate with respect to the loading rack and the MPC, with the outline of the MFTC location.

Figure 20:
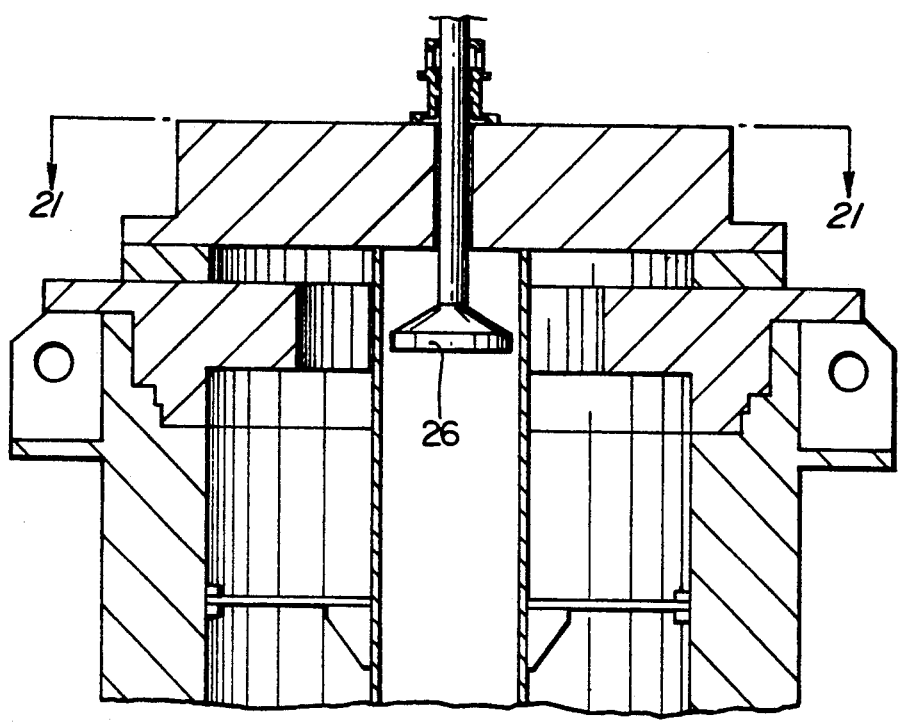

FIG. 20 is a fragmentary view of a single fuel transfer cask.

Figure 21:
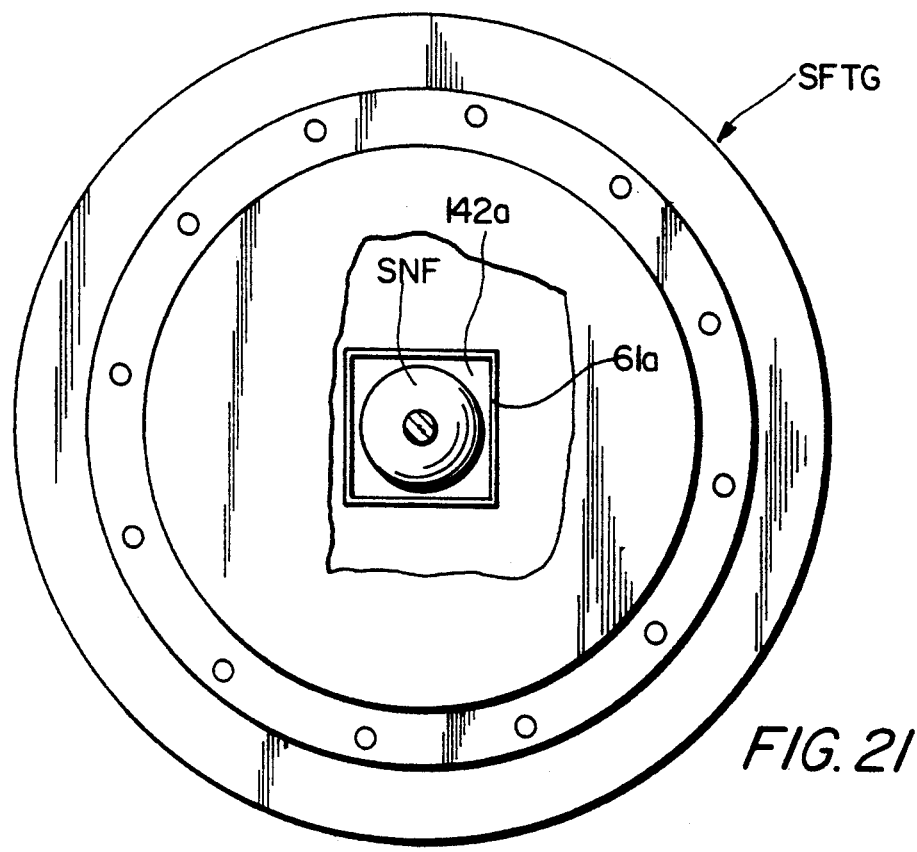

FIG. 21 is a view taken along lines 21—21 of FIG. 20.

Figure 22:
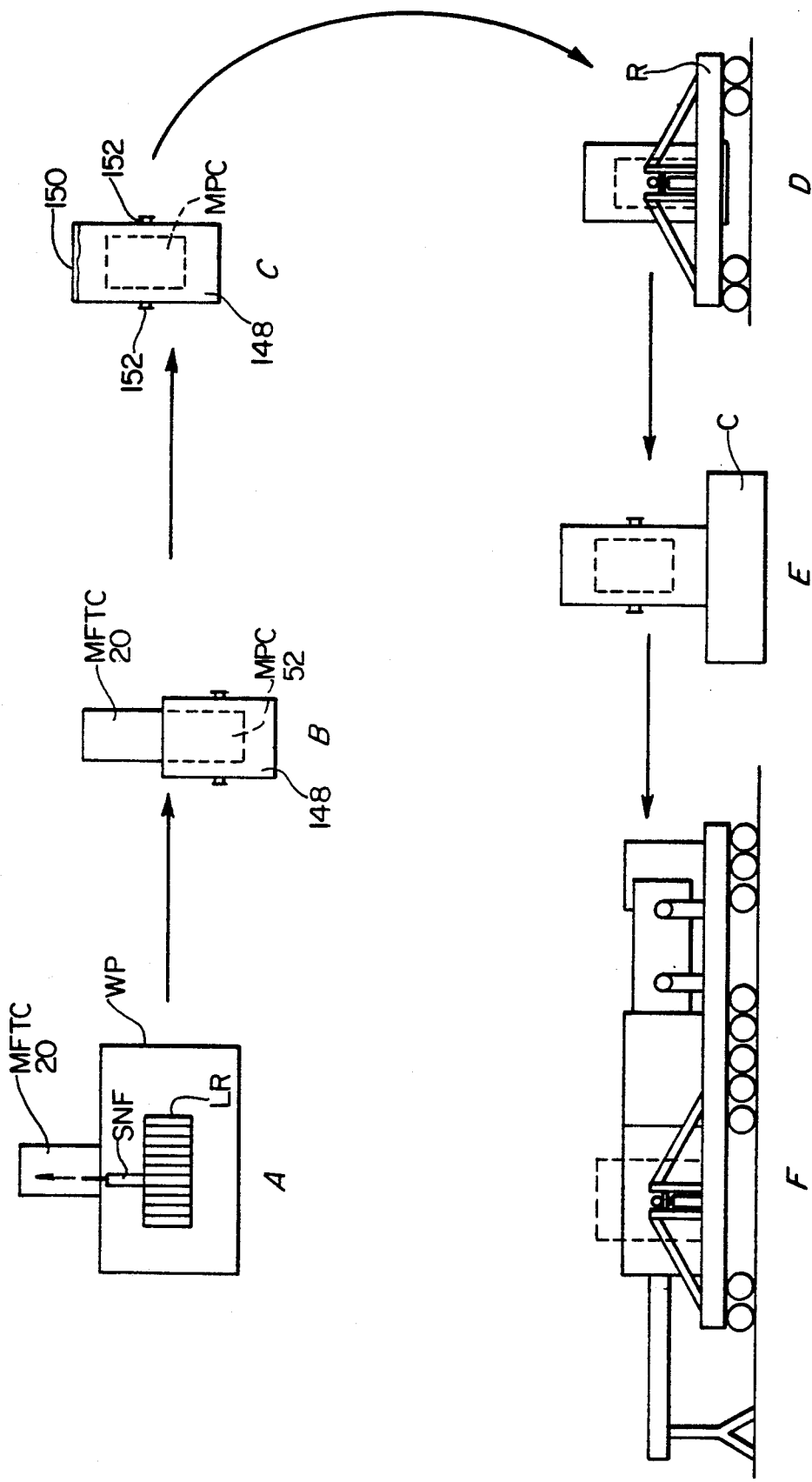

FIG. 22 is a schematic view of the entire operation wherein the MFTC is loaded with the SNF from the wet pit, the MFTC transferred to the MPC. The SNF is lowered into the MPC which is positioned in an overpack, and then the MPC is sealed in the overpack and either placed in temporary storage or transported by rail to permanent storage or other treatment.

DESCRIPTION OF THE PREFERRED EMBODIMENT

In its most basic concept the present invention relates to the dry transfer of spent nuclear fuel (SNF) and is accomplished in three stages, fuel loading, fuel transfer and fuel discharge. After the fuel discharge stage the spent nuclear fuel that usually is in the form of rods may be transported to a storage area or other preselected site for treatment.

Figure 1:
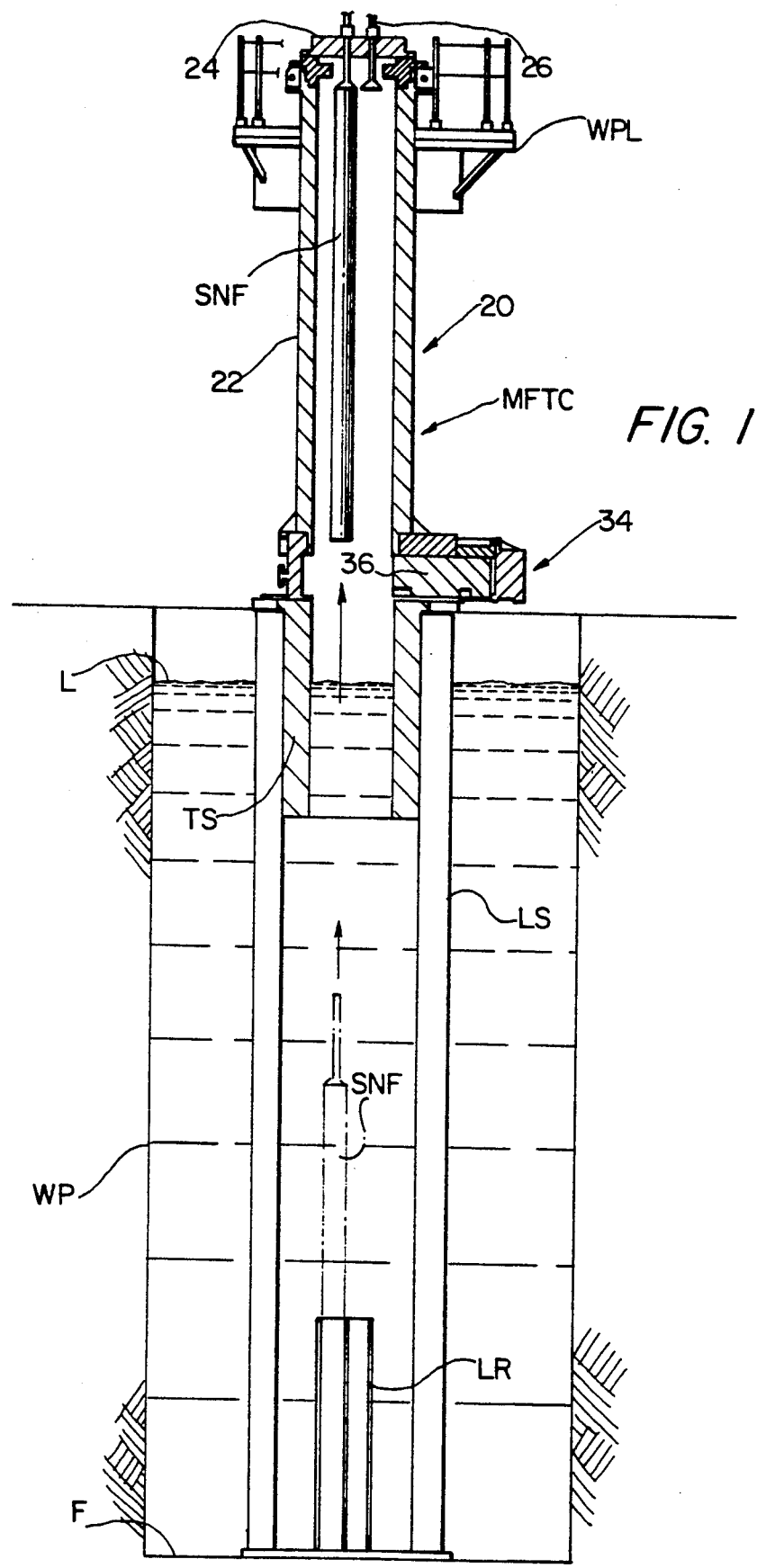
FIG. 1 is an elevational view partly broken away illustrating the positioning of the MFTC over the wet pit having spent nuclear fuel rods in place.

The fuel loading stage is shown in FIG. 1 wherein the wet pit WP is shown. The term "wet pit" is used to describe the water filled pool where the spent nuclear fuel is held after removal from the nuclear reactor. The wet pit may provide storage for a great number of spent nuclear rods and is wet primarily to maintain the rods sufficiently cool if all of the radiation energy has not been dissipated in the reactor. Such wet pits are commonplace in the electric utility industry where commercial nuclear reactors are used particularly. Unfortunately the total space available in such wet pits for additional rods is limited and therefore it is necessary to withdraw these rods for remote storage to make room for newly arrived rods. This is the purpose and intention of the present invention.

The spent nuclear fuel rods are shown as SNF and usually are positioned in the wet pit in an array that allows withdrawal of individual rods. A loading rack LR is positioned in the floor F of the wet pit WP to hold the SNF rods in position for withdrawal. A loading stand LS is positioned in the wet pit from the wet pit floor F up to the top of the wet pit to support the fuel transfer cask either a single (SFTC) or in this case a multiple fuel transfer cask (MFTC).

As shown in the drawing of FIG. 1 the MFTC is identified as 20 and sits atop the loading stand LS with a loading stand transitional shield TS extending down from the bottom of the MFTC 20 below the level of the water L. This shield TS is provided to shield the environment from any residual radiation emanating from the rods as they are withdrawn from the wet pit. The LS is not sufficient in itself to shield the radiation from the SNF rod between the top of the water and the bottom of the MFTC.

The cask 20 is preferably an elongated cylinder having a hollow body 22 and a removable head 24 with grappling or grasping means 26 that are conventional along with appropriate rigging (not shown). A work platform WPL may be positioned to surround the cask 20 at its upper end in order to allow working personnel to observe and provide operational assistance. The cask 20 is preferably made of heavy gauge metal sufficient to support, through the operation of the grapple 26 and the head, a plurality of SNF rods, only one however is shown in FIG. 1. It is also constructed using materials sufficient to shield working personnel against considerable residual radiation emanating from the SNF.

The SNF rods may be stored in any manner in the wet pit WP but for purposes of this invention they are to be moved to preselected positions and held vertically upright in the loading rack LR where they will be directly beneath the grapple 26 and may be moved from the position shown in FIG. 1 in phantom lines to the position in the cask or MFTC also in FIG. 1 as shown in solid lines.

Figure 2:
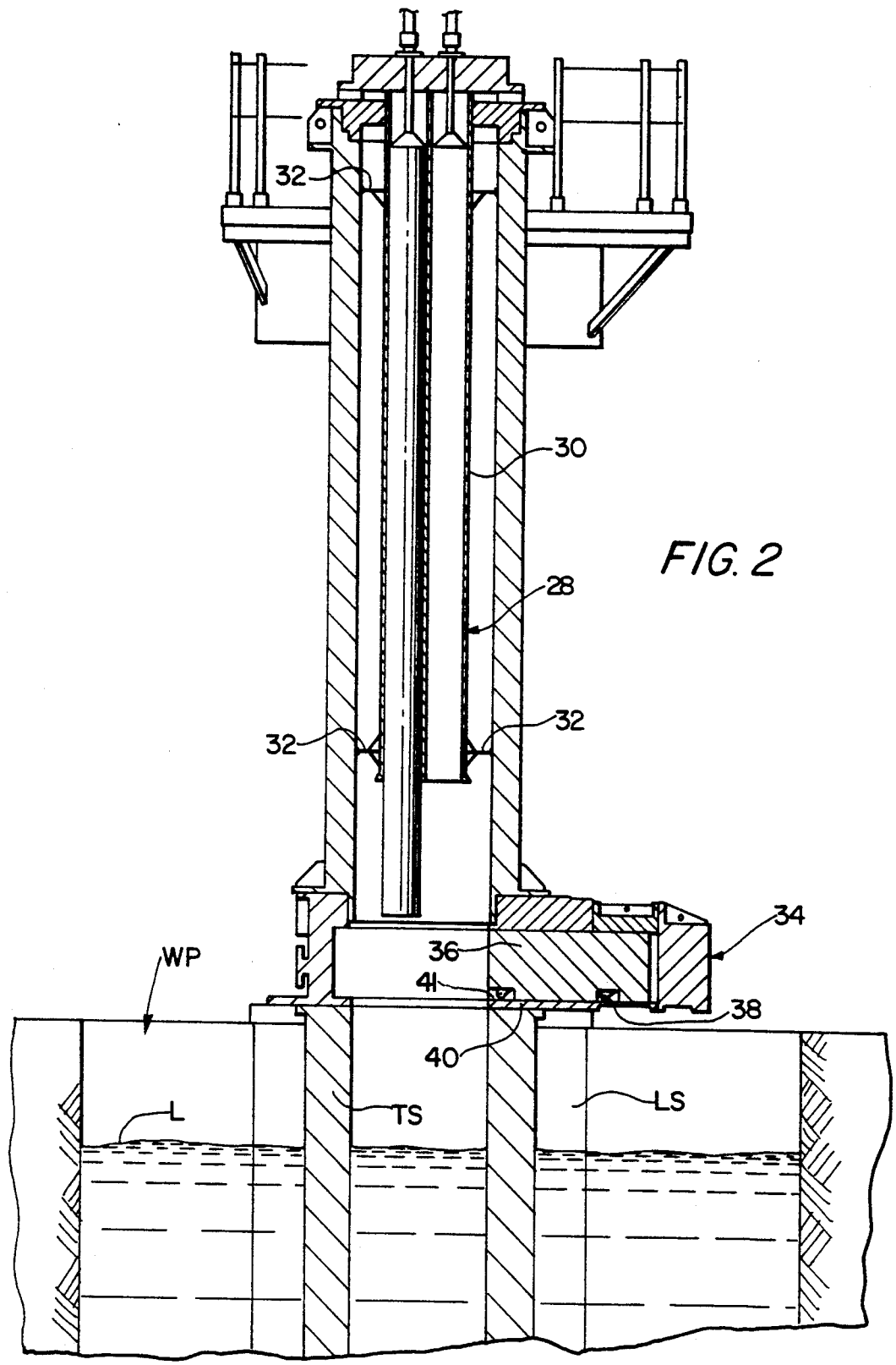
FIG. 2 is an enlarged fragmentary view of FIG. 1 and illustrating the presence of the guide assembly.

The MFTC 20 may also be provided with a guide assembly 28 that is not shown in FIG. 1 for clarity but is shown in FIG. 2. The guide assembly 28 is simply a grouping of at least one elongated tube 30 that receives the SNF rods for vertical positioning. The guide assembly 28 may be supported within the hollow body 22 of the MFTC 20 by the removable head 24 and restrained laterally by the spacer elements 32.

Figure 3:
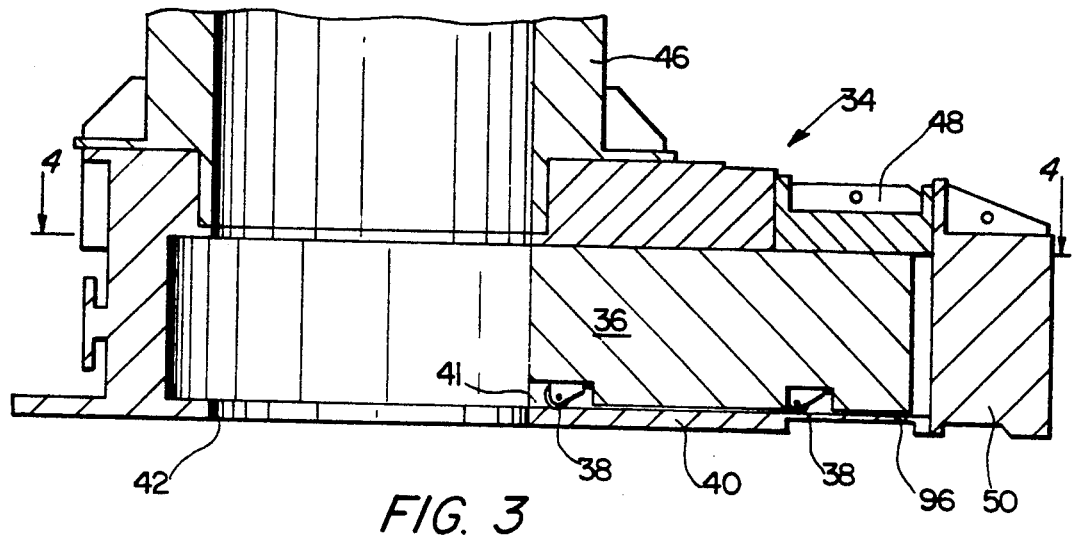
FIG. 3 is a fragmented cross-sectional view in elevation and of the gate assembly for closing the open bottom of the MFTC.
Figure 4:
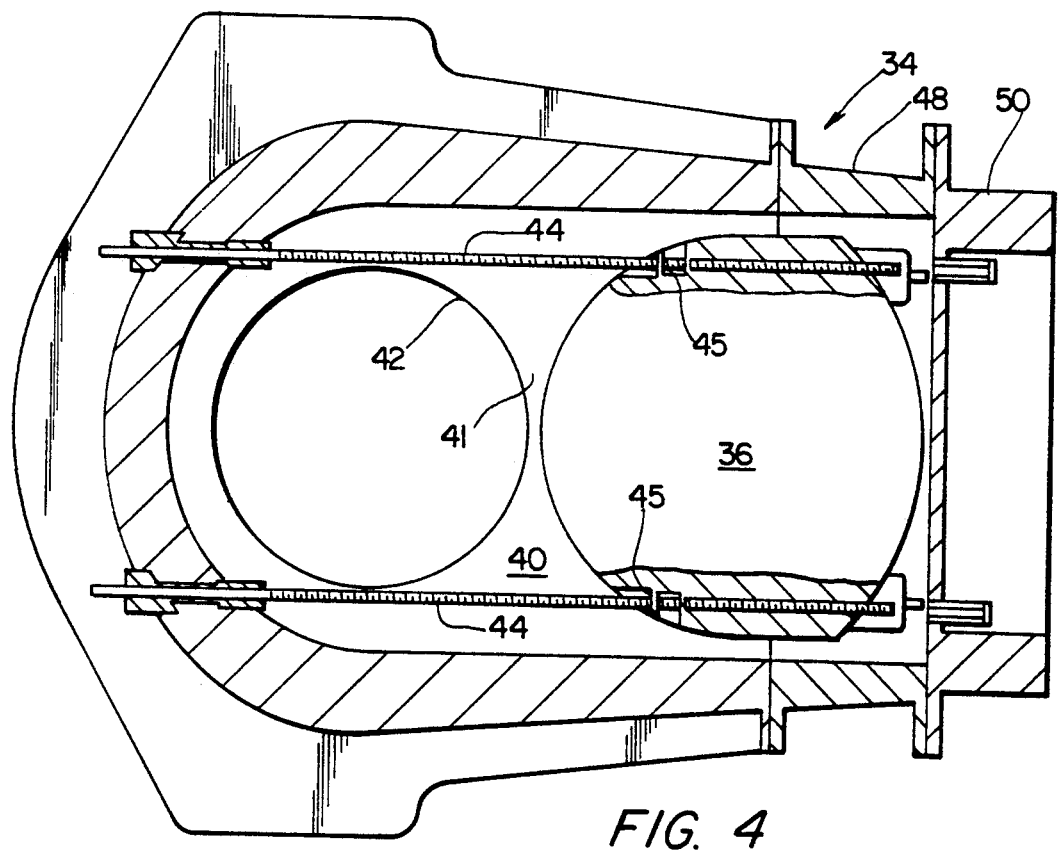
FIG. 4 is a view taken along lines 4—4 of FIG. 3.

As best shown in FIGS. 3 and 4 the MFTC 20 is provided with a gate assembly 34 that includes gate 36 supported on rollers 38 sliding on lower segment 40 of the MFTC. Lower segment 40 as shown in FIG. 4 provides an upper planar surface 41 upon which the rollers 38 may roll. The mechanism for moving the gate 36 to cover the opening 42 in the bottom or lower segment 40 is screw drive 44,44 in which a pair of screws are operated through threaded inserts 45,45 integral with gate 36 to draw the gate 36 in a direction to the left as shown in FIGS. 3 and 4 to cover the opening 42 in the bottom or lower segment 40 of the MFTC. Operation of the screw drive 44,44 in the opposite direction moves gate 36 to the right. The structure shown in FIGS. 3 and 4 is completed by reference to the lower portion 46 of the MFTC and the boot 48 surrounding and providing a cavity for the gate 36. A boot cover 50 is provided at the end of the boot 48 and is removable for maintenance purposes.

In the fuel loading stage for the dry transfer of the SNF rods the conventional grapple 26 as seen in FIG. 2, and fuel handling tool, not depicted, are rigged with conventional cables and lowered through the guide assembly 28. The gate assembly 34 has been operated by the screw drive 44,44 to move gate 36 from the bottom opening 42 s that the grapple 26 may be lowered through the guide assembly 28 and MFTC 20 into the wet pit WP and open its jaws to grapple the SNF rod held in place in the loading rack LR. Once the SNF rod is satisfactorily grappled and held in place by the jaws of the grapple 26, it is raised and secured in place within the MFTC 20. The gate 36 is then moved by screw drive 44,44 to close the bottom opening 42 and locked into position to allow the rigging to be detached from the grapple. The fuel loading stage has now been completed and the MFTC 20 may be removed from the loading stand LS and is ready for the fuel transfer stage.

In the fuel transfer stage the MFTC is transported to a discharge facility as shown in schematic drawing FIG. 22B wherein the multipurpose container MPC, also referred to as container 52, is positioned to receive the MFTC for discharge of the SNF rods into the MPC.

Figure 5:
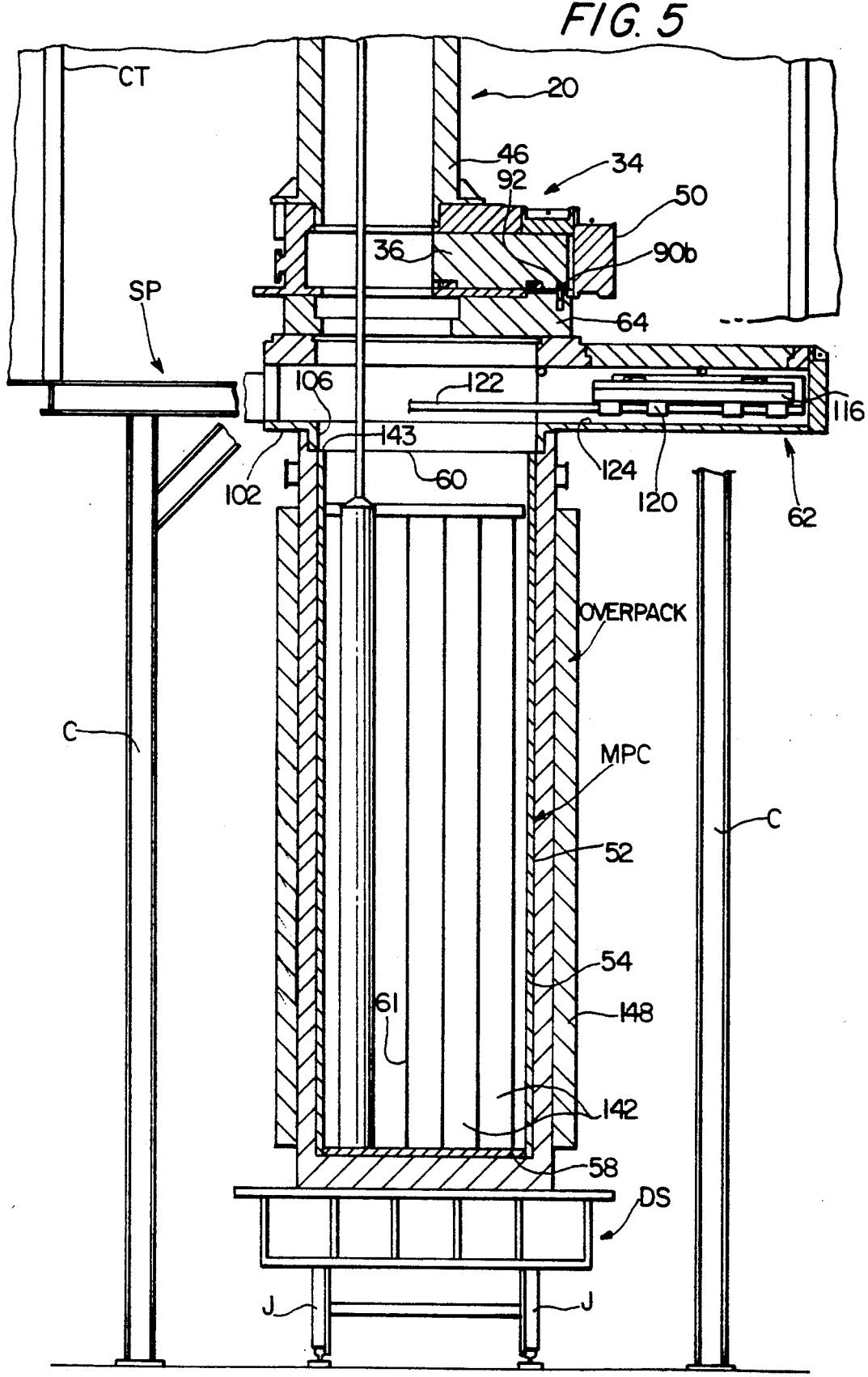
FIG. 5 is an elevational view fragmented and in cross-section of the positioning of the MFTC over the rotatable locator plate, closure means and the MPC in overpack.

FIGS. 5 through 19 illustrate the apparatus and procedures for the fuel discharge phase of the present invention. The MFTC and container 52 having been transported to a discharge facility such as the closure tent CT of FIG. 5 it should be understood that radiological conditions during these operations dictate that general area and localized ventilation are to be in operation. As a minimum operating personnel are required to wear appropriate body protection during these operations.

When the MFTC is transported to the discharge facility within the closure tent CT, the MFTC is lowered and seated onto the MPC 52 which itself is supported on a discharge stand DS that may be suitably supported by a plurality of jacks J to raise or lower the container 52 as desired. A support platform SP having vertical support columns C surrounds the described stacked equipment and provides support for workers and closure tent.

The MPC 52 is composed of a cylindrical body 54 that may be similar to the MFTC body 22 in that it is hollow and of rigid construction. The container body 54 is inserted into conventional antiradiation cladding or overpack 148 for transportation. Container body 54 includes bottom 58 and an open top 60. A loading rack 61 similar to loading rack LR is positioned within the MPC.

Fitted into the open top 60 is a closure assembly or retractable shielding base assembly 62 and a rotatable locator plate 64 upon which the lower segment 40 of the MFTC and therefore the entire weight of the MFTC or cask 20 rests. The rotatable locator plate 64 is positioned between the cask 20 and the closure assembly or retractable shielding base 62.

Figures 6, 7:
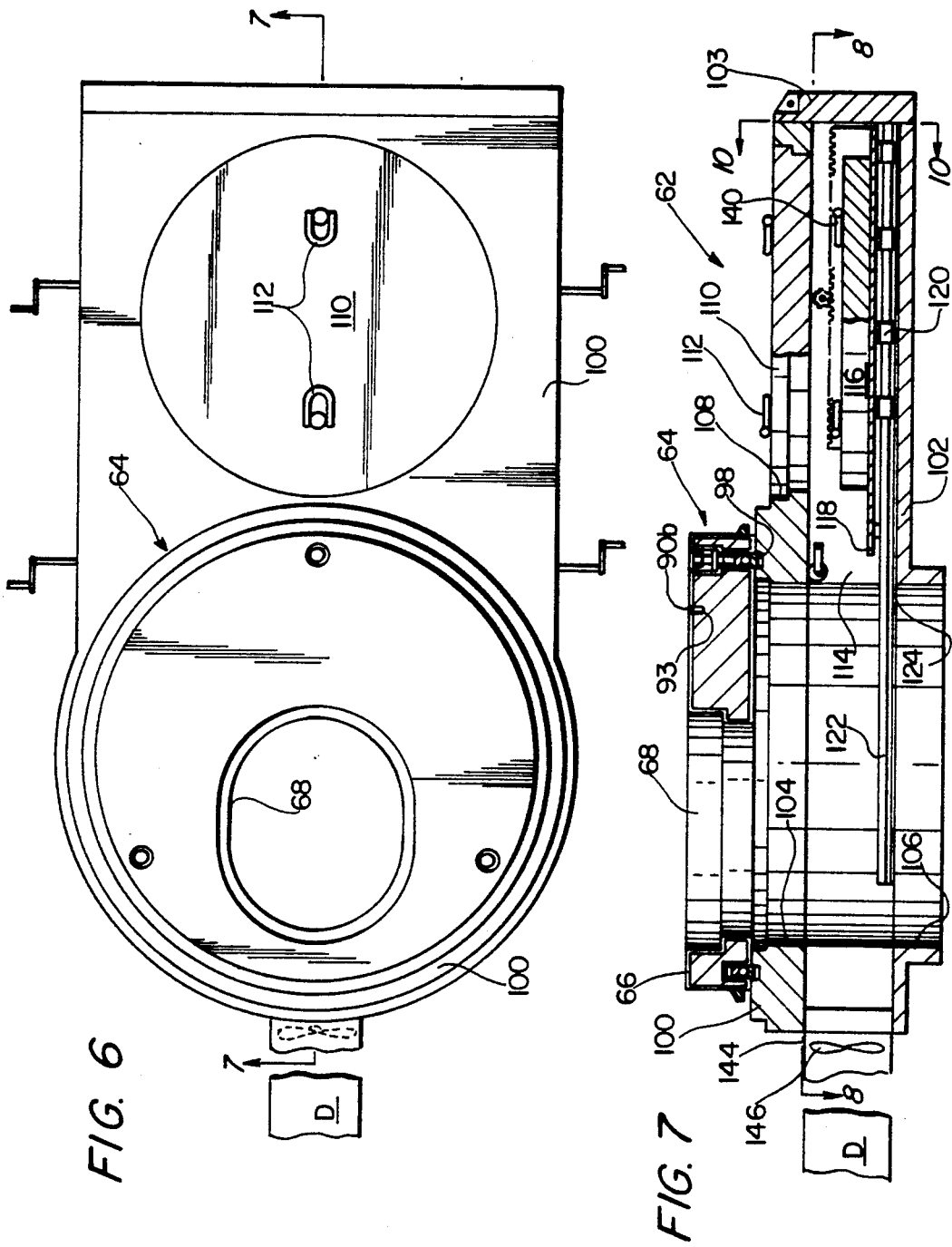
FIG. 6 is a plan view of the locator plate and the closure means illustrating the access opening and the plug.
FIG. 7 is a cross-sectional view taken along lines 7—7 of FIG. 6.
Figure 11:
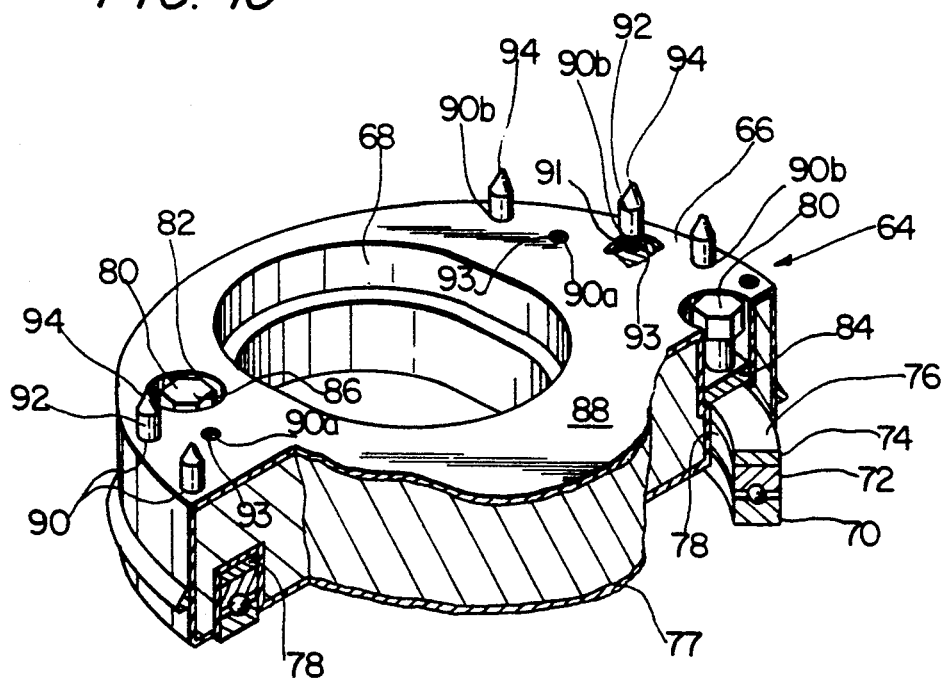
FIG. 11 is a perspective fragmented view of the locator plate illustrating the jacking screw and roller ball mechanism for rotation.
Figure 11B:
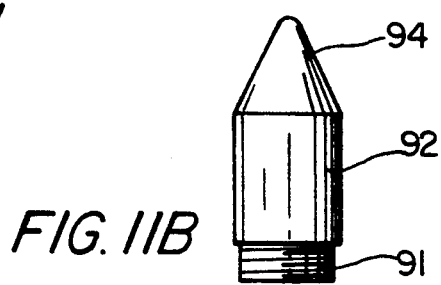
FIG. 11b is an elevational view of an alignment pin having the rounded tip on one end and threaded end at the other.

The rotatable locator plate 64 is best shown in FIGS. 6 and 7 and 11. The rotatable locator plate 64 is composed of a circular body 66 having an access opening 68. The circular body 66 is positioned to revolve about stationary rail or race 70 which supports a plurality of roller bearings 72 and a rotatable rail or upper race 74 upon which is positioned a concentrically coextensive top rail 76. The rotatable locator plate 64 and its circular body 66 are provided with a channel 78 which receives and houses the rail assembly 70, 72, 74 and 76.

Positioned atop the rotatable locator plate 64 are a plurality of jack screws 80 within a counter sunk bore 82 and received within a threaded bore, not shown, in the floor 84 of the counter sunk bore 82. Thus when the jack screw is rotated by the hexagonal nut 86 the body of the jack 80 bears against the top rail 76 so as to raise or lower the rotatable locator plate 64. The purpose of such jacking screws is to raise the rotatable bottom 77 of the locator plate 64 and permit it to rotate on the roller bearings 72.

Positioned on the surface 88 of the locator plate 64 is a plurality of threaded bores 90 that is preferably provided in two sets. The inner set is shown at 90a and the outer set shown at 90b. Alignment pins 92 having a threaded end 91 and a tapered end 94 at the top are screwed into the threaded bores of one set either 90a or 90b and are allowed to protrude upwardly as shown in FIG. 11 with the tapered end 94 protruding upwardly to be received into corresponding unthreaded bores 96 in the lower segment 40 of the cask 20 as may be best shown in FIG. 3 and in FIG. 5. The number and location of unthreaded bores 96 in the lower segment of the cask 20 correspond in number to the position and location of the pins of either the inner or outer sets of threaded bores 90a and 90b respectively. When MFTC or cask 20 is determined to be positioned on the alignment pins 92 screwed into bores 90 as set in threaded bore 90a, for instance, the corresponding unthreaded bores 96 would meet with and be aligned with the appropriate alignment pins 92 screwed into the threaded bores and the MFTC 20 positioned thereon. Should the MFTC or cask 20 be desired to be moved slightly it may be oriented onto pins 90b. The cask 20 is lifted and alignment pins are removed from their set of threaded bores 90a and reinserted appropriately into the threaded bore set 90b where they would find their corresponding unthreaded bores in the lower segment 40 ready for mating. The orientation of the threaded bores 90a and 90b and the corresponding unthreaded bores 96 in the MFTC allow the MFTC or cask 20 to be moved slightly with respect to the rotatable locator plate 64 and particularly with respect to the access opening 68. This slight movement of the MFTC 20 with respect to the access opening 68 allows a different alignment of the SNF with the loading rack 61 at the bottom 58 of the MPC or container 52. Of course, manual rotation of the locator plate 64, without the cask 20 in position also orients the cask relative to the loading rack 61.

Figure 8:
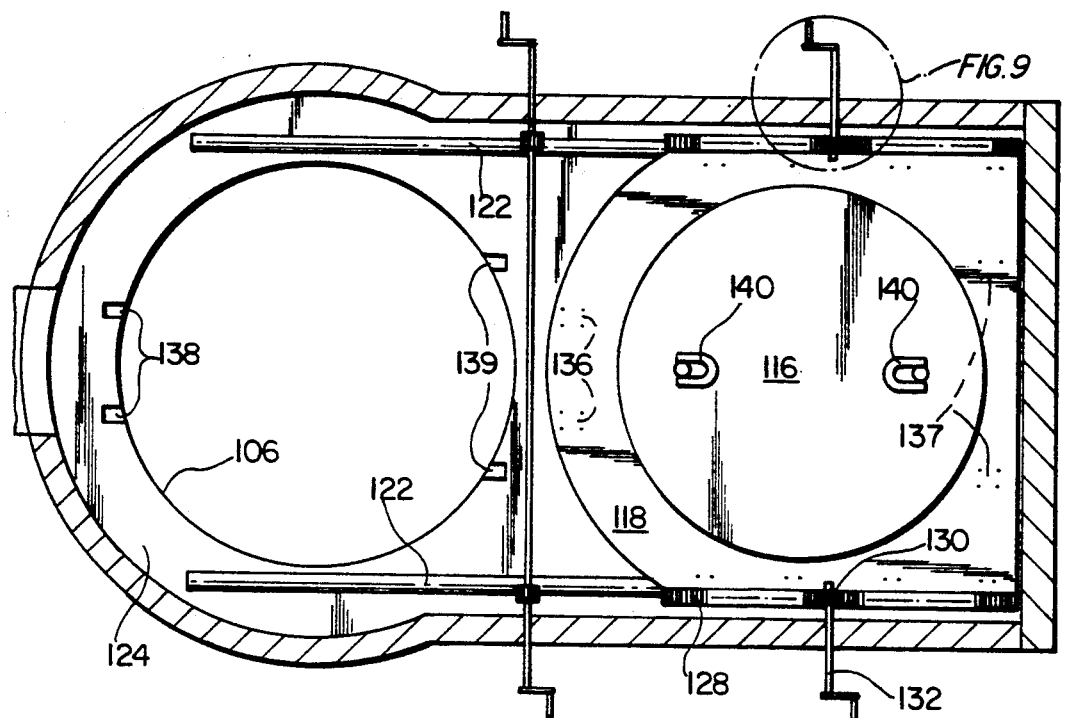
FIG. 8 is a cross-sectional view taken along lines 8—8 of FIG. 7 but without the ventilation means shown.
Figure 9:
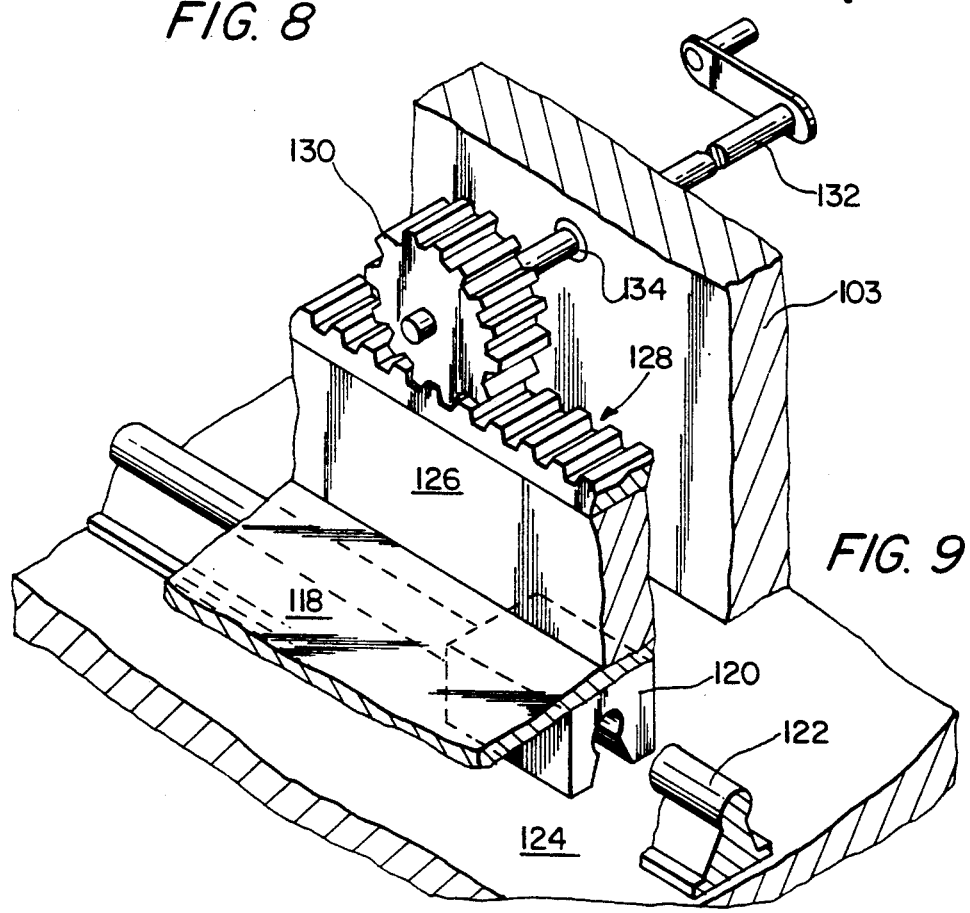
FIG. 9 is a fragmented perspective view of the rack and pinion mechanism for moving the shielding base and shield plug along guide rails.

As best shown in FIG. 7 the stationary rail or lower race 70, shown in FIG. 11, fits into an appropriately positioned and dimensioned groove 98 in the top of the top plate 100 of the closure or retractable shielding base assembly 62. The groove 98 is for the obvious purpose of holding the bottom race or rail at 70 that is stationary. The closure or retractable shielding base assembly 62 is composed of the top plate 100 and the bottom plate 102 held together by concentric ring 103 so that the respective plates are spaced apart as best shown in FIG. 7. The top plate 100 is provided with an opening 104 in the top plate and an opening 106 in the bottom plate. Each of these openings is essentially concentric and in alignment as best shown in FIG. 7. The top plate 100 is also provided with a plug opening 108 into which fits a removable plug 110. The plug 110 is provided with a pair of lifting eyes 112. The space 114 between the top plate 100 and bottom plate 102 of the closure 62 houses a shield plug 116 and a shielding base 118. The shield plug 116 is supported upon the shielding base 118 which in turn is supported on a plurality of pillow blocks 120 that slide on a pair of support rails forming a guide means 122,122 that is fixed to the upper surface 124 of the bottom plate 102. As best shown in FIG. 8 the guide means or support rails 122 straddle the opening 106 in the bottom plate 102. Secured to each side of the shielding base 118 is a gear rail 126 provided with a rack 128 on the upper edge thereof to cooperate with gear or pinion 130 rotated by crank 132 inserted through suitable bore 134 in the ring 103. The same assembly of the gear rail 126, rack 128, gear 130 and crank 132 is repeated again on the other side of shielding base 118 as best shown in FIG. 8. Upon rotating the crank 132 the shielding base and therefore the shield plug 116 may be moved from the position as shown in FIG. 8 to a position overlying the bottom plate opening 106.

Figure 10:
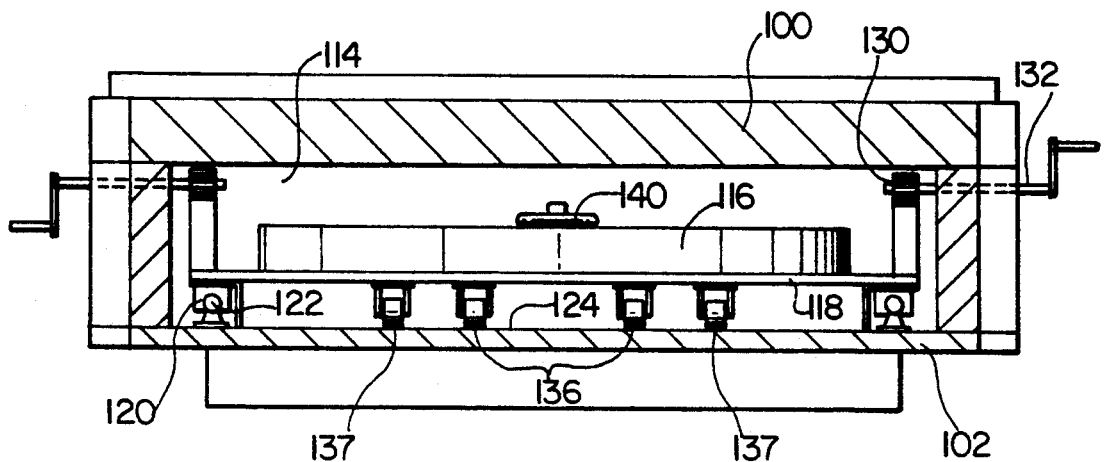
FIG. 10 is a cross-sectional view taken along lines 10—10 of FIG. 7.

The shielding base 118, as is best shown in FIG. 7, is relatively thin compared with the thickness of the shield plug 116. The purpose of the shielding base 118 is simply to support the shield plug 116 and not to add unnecessarily to the height and weight of the entire apparatus. Accordingly because of the weight of the shield plug 116, the support from guide means 122 would not be sufficient and accordingly there is provided two sets of rollers 136,136 and 137,137. The pair of rollers 136,136 are closer together and are positioned closer to the front of the shielding base as can be seen in FIGS. 8 and 10. To accommodate any sagging of the shielding base 118 due to the weight of the shield plug 116, two pairs of chamfered grooves in the front at 138 and at the rear 139 of the opening 106 provide ramps for receiving their respective rollers.

In the operation of the closure 62, the shielding base 118 is cranked to move as it carries the shield plug 116 thereon to temporarily shield the opening 106 while sliding on the rails of the guide means 122. Removal of the rotatable locator plate 64 allows the crane to grasp lifting eyes 140 on the shield plug and allow it to be raised slightly so as to be able to retract the shielding base 118 by means of crank 132 whereupon the shield plug 116 may be lowered to close the open top 60 of the MPC or container 52 by resting on lip 143 of open top 60.

FIGS. 12 through 19 are illustrations of the orientation potential for the rotatable locator plate 64 and the loading rack 61, similar to the loading rack LR in the wet pit WP as previously discussed. The loading rack 61, however, is positioned in the container 52 and includes a plurality of cells 142 which are to hold the SNF rods in place for secure transportation.

Figure 12:
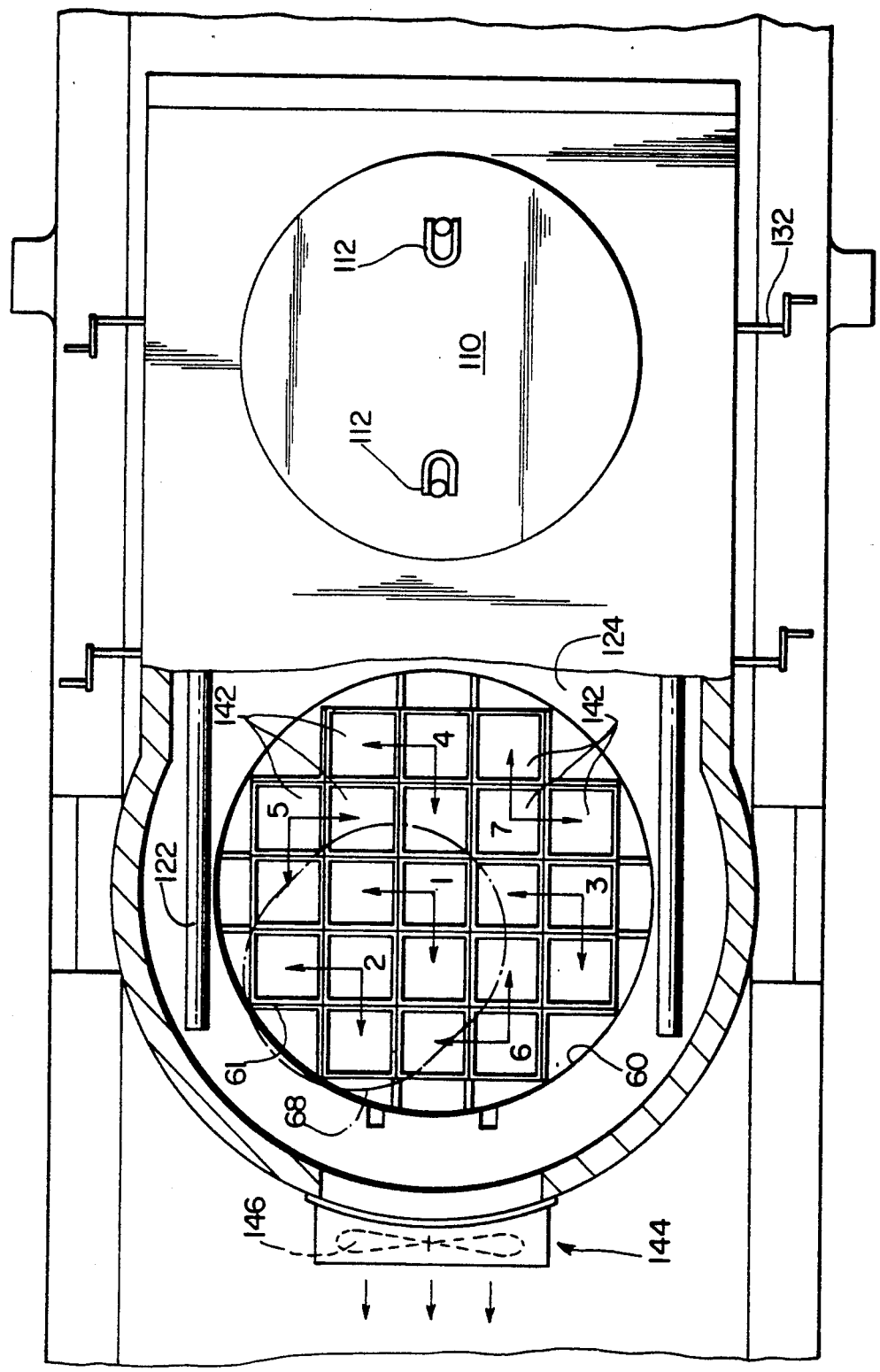
FIG. 12 is a fragmented plan view of fragmentation of the loading rack within the MPC and the plug 110.
Figure 13:
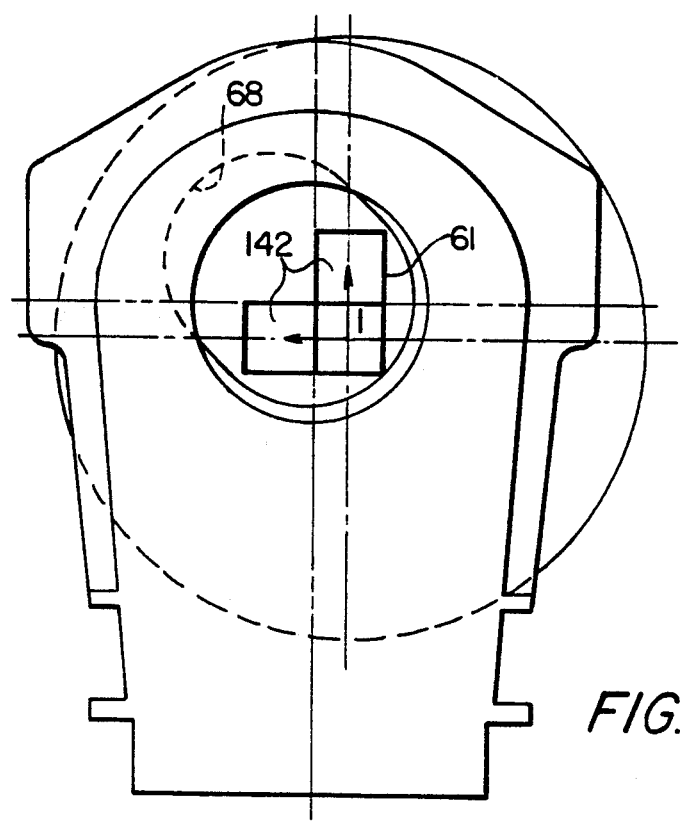
Figure 14:
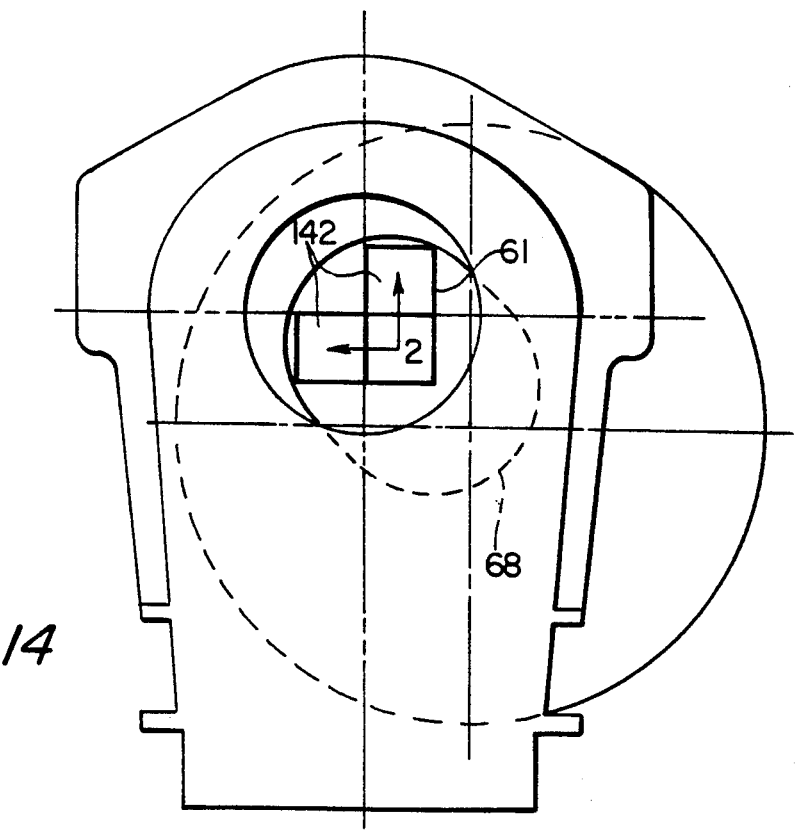
Figure 15:
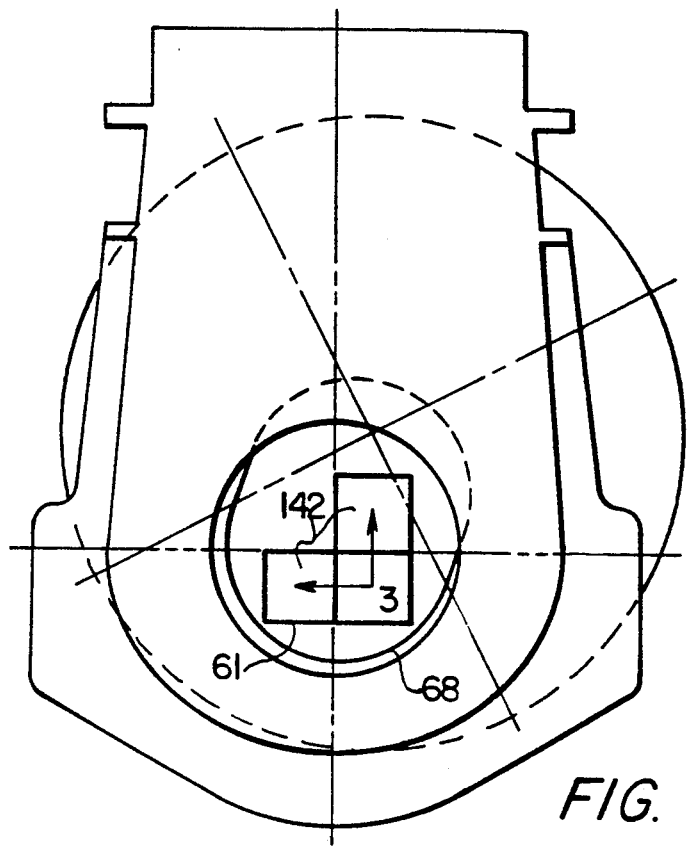
Figure 16:
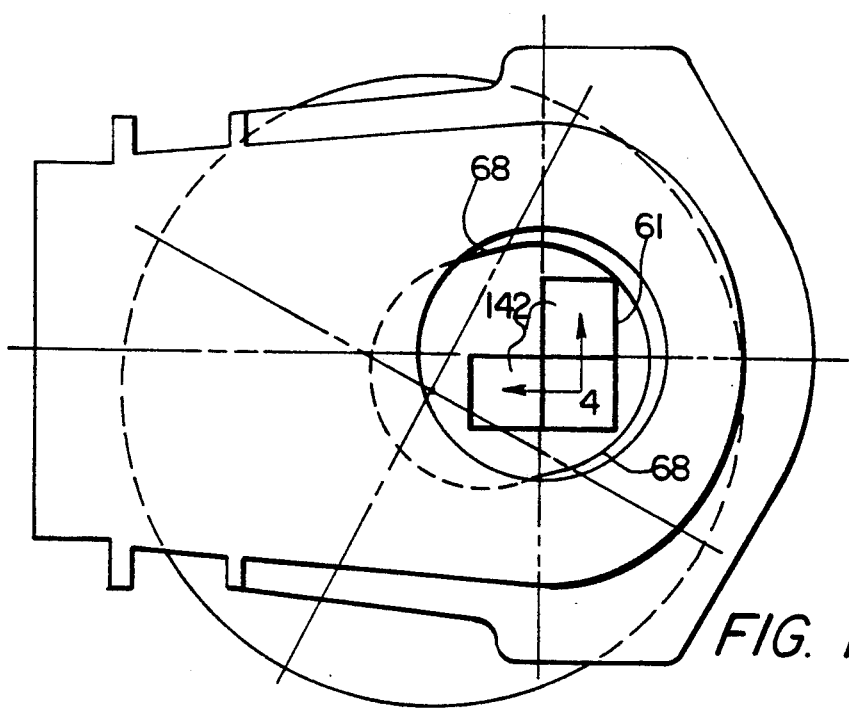
Figure 17:
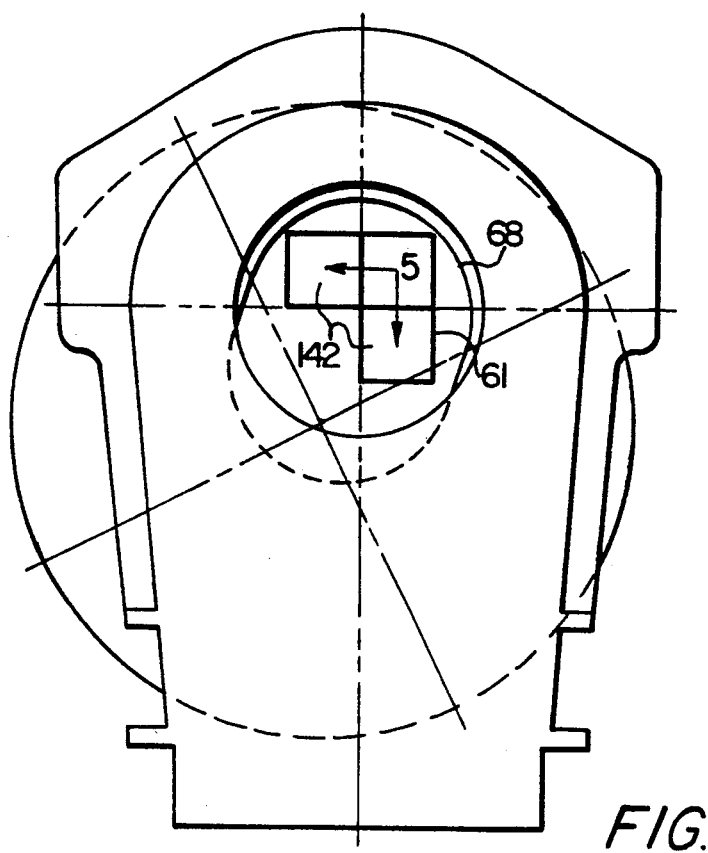
Figure 18:
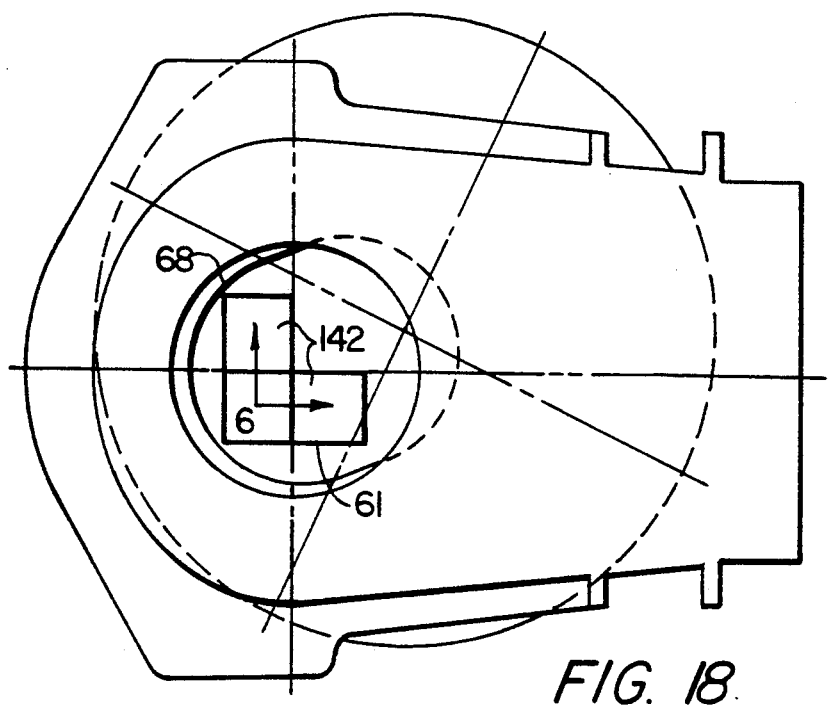
Figure 19:
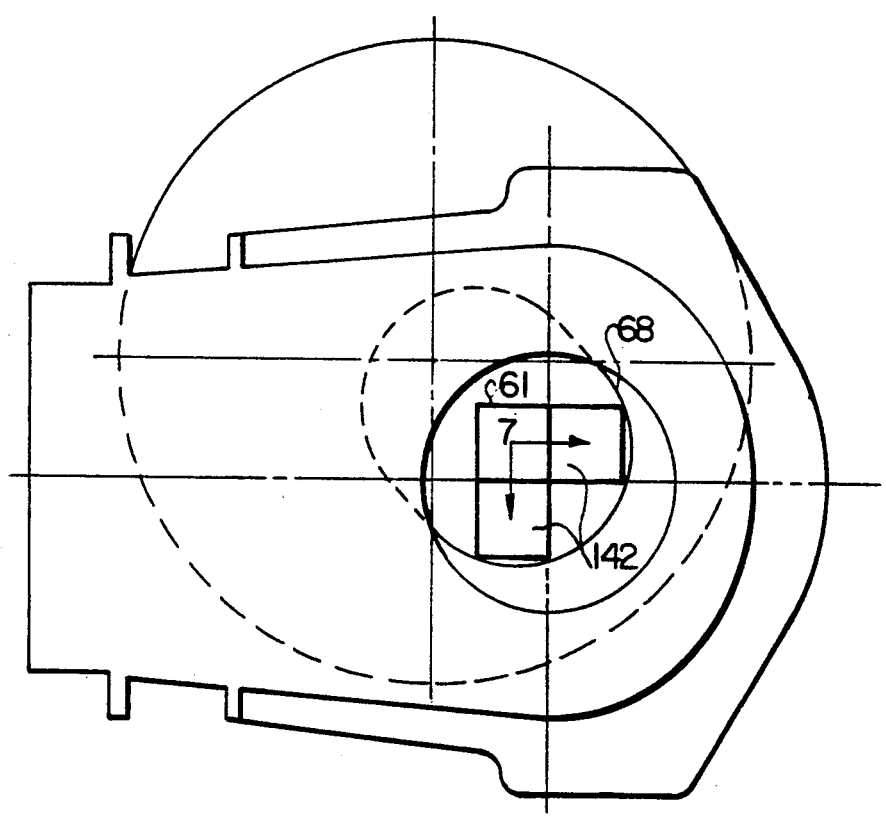

As shown in FIG. 12, the access opening 168 with the MFTC mounted in place as previously outlined reveals two sets of cells labeled 1 and 2. Each set includes three individual cells that may be serviced. A total of twenty-one cells are available in container 52. As shown in FIGS. 13, 14, 15, 16, 17, 18 and 19, rotating the locator plate 64, and as desired, reorienting the MFTC on the locator plate 64 using alignment pins 92 allows access to sets of cells 1, 2, 3, 4, 5, 6 and 7. Each cell of each set of cells may then be accessed and filled with an SNF rod.

It is also an aspect of this invention to include ventilating means shown at 144 of FIG. 7, wherein a negative ventilation trunk 146 withdraws contaminated air in the environment within the apparatus into a decontamination unit D where it is filtered in the conventional fashion.

A multiple fuel transfer cash—MFTC, has been discussed and described at 20 but FIGS. 20 and 21 illustrate a single rod cask, SFTC, with a single grapple 26 and only a single SNF rod positioned within a single cell 142a in the loading rack 61a. After the SNF rods have been positioned within the MPC 52 and the shield plug lowered and sealed as described about the MPC 52, already located in an overpack is preferably sealed into the overpack as shown in FIG. 22B and the overpack 148 sealed with a top lid 150 as shown in FIGS. 22C. The overpack is a conventional radiation-safe container and is used as an added safety precaution. Then the MPC, surrounded by the overpack 148, may be transported by trunnions 152 protruding from both sides of the overpack 148 and transported to a rail car R as shown in FIG. 22D or if the MPC is to be stored on site it could be put on a concrete base C as shown in FIG. 22E or in a vault rather than on the rail car R. If the rail car is to be utilized the overpack 148 may be tilted on its trunnions 152 as shown in FIG. 22F so that it lies horizontally.

It is believed that the foregoing description meets the objects of the invention which should be limited solely by the appended claims, wherein we claim:

1. A method for extraction of spent nuclear fuel rods stored in a wet pit for transportation to a selected area for storage or treatment comprising:
   providing a fuel transfer cask having a bottom that may be opened and closed by a gate,
   positioning said bottom of said cask above a selected one of said rods,
   drawing at least one of said rods out of said wet pit and through the bottom of said cask whereby said rod is dry and fully enclosed within said cask,
   closing the gate at the bottom of said cask beneath said rod,
   moving said cask with at least said one rod therewithin and dry to a remote location,
   providing a dry container having an open top for receiving at least one of said rods from said cask,
   superposing said bottom of said cask over the open top of said container,
   opening said gate to provide communication between said cask and said container,
   lowering at least one of said rods dry into said dry transport container, and
   closing said open top of said container to secure said rod whereby said container with at least one of said spent nuclear rods may be transported to said selected area.

2. The method of claim 1 including,
   enclosing said container with said spent nuclear fuel rod in an outer overpack,
   attaching a top lid to said overpack to secure said container and said rod therewithin, and
   raising said overpack onto a vehicle for transportation to said selected area.

3. The method of claim 1 including,
   ventilating the environment at said communication between said cask and said container by withdrawing air therein.

4. The method of claim 1 including,
   ventilating the environment at said communication between said cask and said container by withdrawing air therein,
   providing a shield plug for closing said open top of said container,
   lowering said shield plug onto said open top of said container, and
   closing and sealing said open top with said shield plug.

5. The method of claim 4 including,
   providing a shielding base,
   supporting said shield plug with said base adjacent said open top,
   moving said base and said shield plug into position over said open top,
   raising said shield plug from said base, and
   moving said base from said open top prior to lowering said shield plug onto said open top.

6. The method of claim 1 including,
   preselecting one of said rods for lowering into said container,
   preselecting a position in said container to receive said one rod, aligning said cask to superpose said one rod over said preselected position, and
thereafter lowering said one rod into said preselected position in said container.

7. The method of claim 1 including,
enclosing said container with said spent nuclear fuel rod in an outer overpack,
attaching a top lid to said overpack to secure said container and said rod therewithin, and
raising said overpack onto a vehicle for transportation to said selected area.

8. The method of claim 1 including,
providing a shield plug for closing said open top of said container,
lowering said shield plug onto said open top of said container,
closing and sealing said open top with said shield plug,
enclosing said container with said spent nuclear fuel rods in an outer overpack,
attaching a top lid to said overpack to secure said container and said rod therewithin, and
raising said overpack onto a vehicle for transportation to said selected area.

9. The method of claim 1 including,
providing a shield plug for closing said open top of said container,
providing a shielding base,
supporting said shield plug with said base adjacent said open top,
moving said base and said shield plug into position over said open top,
raising said shield plug from said base,
moving said base from said open top prior to lowering said shield plug onto said open top,
lowering said shield plug onto said open top of said container,
closing and sealing said open top with said shield plug,
enclosing said container with said spent nuclear fuel rod in an outer overpack, and
attaching a top lid to said overpack to secure said container and said rod therewithin.

10. The method of claim 1 including,
preselecting one of said rods for lowering into said container,
preselecting a position in said container to receive said one rod,
aligning said cask to superpose said one rod over said preselected position,
thereafter lowering said one rod into said preselected position in said container,
providing a shield plug for closing said open top of said container,
lowering said shield plug onto said open top of said container, and
closing and sealing said open top with said shield plug.

11. The method of claim 1 including,
providing a shield plug for closing said open top of said container,
providing a shielding base,
supporting said shield plug with said base adjacent said open top,
preselecting one of said rods for lowering into said container,
preselecting a position in said container to receive said one rod,
aligning said cask to superpose said one rod over said preselected position,
thereafter lowering said one rod into said preselected position in said container,
moving said base and said shield plug into position over said open top,
raising said shield plug from said base,
moving said base from said open top prior to lowering said shield plug onto said open top,
lowering said shield plug onto said open top of said container, and
closing and sealing said open top with said shield plug.

12. The method of claim 1 including,
providing s shield plug for closing said open top of said container,
providing a shielding base,
supporting said shield plug with said base adjacent said open top,
preselecting one of said rods for lowering into said container,
preselecting a position in said container to receive said one rod,
aligning said cask to superpose said one rod over said preselected position,
thereafter lowering said one rod into said preselected position in said container,
moving said base and said shield plug into position over said open top,
raising said shield plug from said base,
moving said base from said open top prior to lowering said shield plug onto said open top,
lowering said shield plug onto said open top of said container,
closing and sealing said open top with said shield plug,
enclosing said container with said spent nuclear fuel rod in an outer overpack, and
attaching a top lid to said overpack to secure said container and said rod therewithin.

13. The method of claim 1 including,
ventilating the environment at said communication between said cask an said container by withdrawing air therein,
providing a shield plug for closing said open top of said container,
providing a shielding base,
supporting said shield plug with said base adjacent said open top,
preselecting one of said rods for lowering into said container,
preselecting a position in said container to receive said one rod,
aligning said cask to superpose said one rod over said preselected position,
thereafter lowering said one rod into said preselected position in said container,
moving said base and said shield plug into position over said open top,
raising said shield plug from said base,
moving said base from said open top prior to lowering said shield plug onto said open top,
lowering said shield plug onto said open top of said container,
closing and sealing said open top with said shield plug,
enclosing said container with said spent nuclear fuel rod in an outer overpack, attaching a top lid to said overpack to secure said container and said rod therewithin, and raising said overpack onto a vehicle for transportation to said selected area.

14. An apparatus for extraction of spent nuclear fuel rods stored in a wet pit for transportation to a selected area for storage or treatment comprising, a fuel transfer cask having an elongated hollow body and a bottom and a head, a gate positioned in said bottom to open and close said bottom, means connected to said cask for grasping at least one of said rods from said wet pit and drawing said rod into said body of said cask, and retaining said rod dry in said cask, an elongated container having an open top, said cask being superposed on top of said container in a position such that said bottom of said cask faces the open top of said container, means for transferring at least one of said rods from said cask to said container, closure means connected between said cask and said container for closing said open top of said container with said rods dry therein, and whereby said rods transferred from the cask to said container are maintained dry so as to be then transported to said selected area.

15. The apparatus of claim 14 including,
said closure means having a shield plug movable towards said open top.

16. The apparatus of claim 14 including,
said closure means having a shielding base for transporting said shield plug.

17. The apparatus of claim 14 including,
said closure means having a shield plug and a shielding base.

18. The apparatus of claim 14 including,
said closure means including a guide means, a shield plug for movement on said guide means towards said open top of said container.

19. The apparatus of claim 14 including,
said closure means including a guide means, a shield plug for movement on said guide means towards said open top of said container and a shielding base supporting said shield plug for movement along said guide means from a first position distal to said open top to a second position superposed upon said open top.

20. The apparatus of claim 19 including,
said guide means being rails on each side of said open top.

21. The apparatus of claim 14 including,
said closure means having a bottom plate,
said bottom plate having an opening corresponding to that of said open top and a plate portion forming a first position,
said closure means having a shield plug movable towards said open top,
said closure means having a shielding base for supporting said shield plug,
said shielding base along with said shield plug temporarily shielding said open top, and
guide means on each side of said bottom plate to control movement of said shielding base and said shield plug from said first position to a second position superposed over said open top.

22. The apparatus of claim 14 including,
a rotatable locator plate positioned between said closure means and said cask.

23. The apparatus of claim 22 including,
said locator plate having alignment pins for receiving and orienting said cask into a preselected position.

24. The apparatus of claim 22 including,
said locator plate having an access opening in communication with said open top and offset from the center thereof whereby vertical access to said container may be attained through said access opening, and
rotation means connected to said locator plate to permit said access opening to rotate relative to said container.

25. The apparatus of claim 14 including,
a rotatable locator plate positioned between said closure means and said cask,
said locator plate having alignment pins for receiving and orienting said cask into a preselected position, and
said locator plate having an access opening in communication with said open top and offset from the center thereof whereby vertical access to said container may be attained through said access opening.

26. The apparatus of claim 14 including,
said closure means including a guide means, a shield plug for movement on said guide means towards said open top of said container,
said guide means being rails on each side of said open top,
said closure means having a bottom plate,
said bottom plate having an opening corresponding to that of said open top and a plate portion forming a first position,
said closure means having a shield plug movable towards said open top,
said closure means having a shielding base for transporting said shield plug towards said open top,
said shielding base supporting said shield plug, and
guide means on each side of said bottom plate to control movement of said shielding base and said shield plug to a second position superposed over said open top from said first position.

27. The apparatus of claim 14 including,
said closure means including a guide means, a shield plug for movement on said guide means towards said open top of said container and a shielding base supporting said shield plug for movement along said guide means from a first position distal to said open top to a second position superposed upon said open top,
said guide means being rails on each side of said open top,
said closure means having a bottom plate,
said bottom plate having an opening corresponding to that of said open top and a plate portion forming a first position,
said closure means having a shield plug movable towards said open top,
said guide means being on each side of said bottom plate to control movement of said shielding base and said shield plug to a second position superposed over said open top from said first position.

28. The apparatus of claim 14 including,
a rotatable locator plate positioned between said closure means and said cask,
said closure means including a guide means, a shield plug for movement on said guide means towards said open top of said container and a shielding base supporting said shield plug for movement along said guide means from a first position distal to said open top to a second position superposed upon said open top, said guide means being rails on each side of said open top, said closure means having a bottom plate, said bottom plate having an opening corresponding to that of said open top and a plate portion forming a first position, said closure means having a shield plug movable towards said open top, and said guide means being on each side of said bottom plate to control movement of said shielding base and said shield plug to a second position superposed over said open top from said first position.

29. The apparatus of claim 14 including, a rotatable locator plate positioned between said closure means and said cask to permit aligning said cask relative to said container, said locator plate having alignment pins for receiving and orienting said cask into a preselected position, said closure means including a guide means, a shield plug for movement on said guide means towards said open top of said container and a shielding base supporting said shield plug for movement along said guide means from a first position distal to said open top to a second position superposed upon said open top, said guide means being rails on each side of said open top, said closure means having a bottom plate, said bottom plate having an opening corresponding to that of said open top and a plate portion forming a first position, said closure means having a shield plug movable towards said open top, and said guide means being on each side of said bottom plate to control movement of said shielding base and said shield plug to a second position superposed over said open top from said first position.

30. The apparatus of claim 14 including, a rotatable locator plate positioned between said closure means and said cask to permit aligning said cask relative to said container, said locator plate having alignment pins for receiving and aligning said cask into a preselected position, said locator plate having an access opening in communication with said open top and offset from the center thereof whereby vertical access to said container may be attained through said access opening, rotation means connected to said locator plate to permit said access opening to rotate relative to said container, said closure means including a guide means, a shield plug for movement on said guide means towards said open top of said container and a shielding base supporting said shield plug for movement along said guide means from a first position distal to said open top to a second position superposed upon said open top, said guide means being rails on each side of said open top, said closure means having a bottom plate, said bottom plate having an opening corresponding to that of said open top and a plate portion forming a first position, said closure means having a shield plug movable towards said open top, and said guide means being on each side of said bottom plate to control movement of said shielding base and said shield plug to a second position superposed over said open top from said first position.

31. The apparatus of claim 14 including, ventilating means positioned to withdraw air between said cask and said container.

32. The apparatus of claim 14 including, a rotatable locator plate positioned between said closure means and said cask to permit aligning said cask relative to said container, said locator plate having alignment pins for receiving and aligning said cask into a preselected position, said locator plate having an access opening in communication with said open top and offset from the center thereof whereby vertical access to said container may be attained through said access opening, rotation means connected to said locator plate to permit said access opening to rotate relative to said container, said closure means including a guide means, a shield plug for movement on said guide means towards said open top of said container and a shielding base supporting said shield plug for movement along said guide means from first position distal to said open top to a second position superposed upon said open top, said guide means being rails on each side of said open top, said closure means having a bottom plate, said bottom plate having an opening corresponding to that of said open top and a plate portion forming a first position, said closure means having a shield plug movable towards said open top, said guide means being on each side of said bottom plate to control movement of said shielding base and said shield plug to a second position superposed over said open top from said first position, and ventilating means positioned to withdraw air between said cask and said container.

* * * * *

UNITED STATES PATENT AND TRADEMARK OFFICE
CERTIFICATE OF CORRECTION

PATENT NO. : 5,319,686
DATED      : June 7, 1994
INVENTOR(S) : John R. Pizzano, Robert M. Donovan It is certified that error appears in the above-identified patent and that said Letters Patent is hereby corrected as shown below:

In col. 6, line 16, delete "90b" and insert therefor -- 92 --.

In col. 7, line 51, delete "cash" and insert therefor -- cask --.

In col. 10, line 15, delete "s" and insert therefor -- a --.
On the title page, item [54] and Col. 1, lines 1-2,
   In the title, cancel the entire title and replace with
-- Dry Transfer of Spent Nuclear Fuel Rods for Transportation --.

Signed and Sealed this

Eighteenth Day of October, 1994

Attest:

BRUCE LEHMAN

Attesting Officer

Commissioner of Patents and Trademarks